United States Patent
Fukuda et al.

(10) Patent No.: US 6,945,888 B2
(45) Date of Patent: Sep. 20, 2005

(54) COMBINED ANALOG AND DIGITAL DERAILLEUR POSITION PROCESSING APPARATUS

(75) Inventors: Masahiko Fukuda, Amagasaki (JP); Haruyuki Takebayashi, Yao (JP)

(73) Assignee: Shimano, Inc., Sakai (JP)

(*) Notice: Subject to any disclaimer, the term of this patent is extended or adjusted under 35 U.S.C. 154(b) by 57 days.

(21) Appl. No.: 10/302,517

(22) Filed: Nov. 21, 2002

(65) Prior Publication Data

US 2004/0102269 A1 May 27, 2004

(51) Int. Cl.⁷ .................... F16H 61/02; F16H 59/02
(52) U.S. Cl. ................. 474/70; 474/82; 474/80
(58) Field of Search .................. 474/78–12, 70–71; 180/205–206, 220–221; 73/118.1, 570, 862.321, 862.322; 702/44; 340/432, 438, 456

(56) References Cited

U.S. PATENT DOCUMENTS

| | | | |
|---|---|---|---|
| 3,863,512 A | * | 2/1975 | Crawley .................... 474/80 |
| 3,919,891 A | | 11/1975 | Stuhlmuller et al. |
| 4,861,320 A | | 8/1989 | Nagano |
| 4,946,425 A | | 8/1990 | Bühlmann |
| 5,359,884 A | | 11/1994 | Fey et al. |
| 5,470,277 A | | 11/1995 | Romano |
| 5,480,356 A | | 1/1996 | Campagnolo |
| 5,514,041 A | * | 5/1996 | Hsu ........................... 474/78 |
| 5,992,553 A | * | 11/1999 | Morrison .................. 180/206 |
| 6,162,140 A | | 12/2000 | Fukuda |
| 6,216,078 B1 | | 4/2001 | Jinbo et al. |
| 6,569,045 B1 | * | 5/2003 | Campagnolo ............... 474/70 |
| 6,623,389 B1 | * | 9/2003 | Campagnolo ............... 474/70 |
| 6,676,554 B2 | * | 1/2004 | Dal Pra' ................... 180/205 |

FOREIGN PATENT DOCUMENTS

| | | | | |
|---|---|---|---|---|
| DE | 4022473 A1 | 1/1992 | | |
| DE | 4231761 A1 | 3/1994 | | |
| DE | 4422845 A1 | 1/1995 | | |
| DE | 4340471 | 2/1995 | | |
| FR | 2587079 A1 | 3/1987 | | |
| FR | 2604969 A1 | 5/1988 | | |
| JP | 2000-95181 A | * | 4/2000 | ......... B62M/25/08 |
| JP | 2001-339910 A | * | 12/2001 | ......... H02K/11/00 |

* cited by examiner

Primary Examiner—Marcus Charles
(74) Attorney, Agent, or Firm—James A. Deland

(57) ABSTRACT

A derailleur position processing apparatus includes a derailleur moving member that moves with the derailleur; an analog signal providing mechanism operatively coupled to the derailleur moving member, wherein the analog signal providing mechanism provides an analog position signal in response to movement of the derailleur moving member; and a digital signal providing mechanism operatively coupled to the derailleur moving member, wherein the digital signal providing mechanism provides a digital position signal in response to movement of the derailleur moving member.

20 Claims, 13 Drawing Sheets

| Gear Position | Digital Position Memory | Analog Position Memory |
|---|---|---|
| 1 | A | a |
| 2 | B | b |
| 3 | C | c |
| 4 | D | d |
| 5 | E | e |
| 6 | F | f |
| 7 | G | g |

Fig. 9

| Gear Position | Digital Position Memory | Analog Position Memory |
|---|---|---|
| 1 | A | a |
| 2 | B | b |
| 3 | C | c |
| 4 | D | d |
| 5 | E | e' |
| 6 | F | f |
| 7 | G | g |

Fig. 10

| Gear Position | Digital Position Memory | Analog Position Memory |
|---|---|---|
| 1 | A | a |
| 2 | B | b |
| 3 | C | c |
| 4 | D | d" |
| 5 | E | e' |
| 6 | F | f |
| 7 | G | g |

Fig. 11

| Gear Position | Digital Position Memory | Analog Position Memory |
|---|---|---|
| 1 | A | a'' |
| 2 | B | b'' |
| 3 | C | c'' |
| 4 | D | d'' |
| 5 | E | e' |
| 6 | F | f' |
| 7 | G | g'' |

Fig. 12

| Gear Position | Digital Position Memory | Analog Position Memory |
|---|---|---|
| 1 | A | a'' |
| 2 | B | b'' |
| 3 | C | c'' |
| 4 | D | d'' |
| 5 | E | e'<br>(E → Position Counter 610) |
| 6 | F | f' |
| 7 | G | g'' |

Fig. 13

COMBINED ANALOG AND DIGITAL DERAILLEUR POSITION PROCESSING APPARATUS

BACKGROUND OF THE INVENTION

The present invention is directed to bicycles and, more particularly, to various features of a derailleur position processing apparatus.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleur transmissions were manually controlled by a hand operated actuator such as a lever or twist-grip attached to the bicycle handlebar, wherein the derailleur is connected to the actuator by a bowden cable. Recently, various electronic devices have been used to determine one or more operating parameters of the derailleur. Such parameters may be used for informational purposes or for electronically controlling the derailleur.

A common operating parameter is the position of the derailleur relative to the plurality of sprockets. In the past, potentiometers that cooperated with various moving components of the derailleur were used to ascertain the position of the derailleur. Since derailleurs usually have a relatively small range of motion, high precision potentiometers were required for this purpose. That was especially true when the information provided by the potentiometer is used by an electronic device to shift the chain among the plurality of sprockets. Unfortunately, high precision potentiometers are relatively expensive, thus making electronically controlled derailleurs using high precision potentiometers unsuitable for mass production. Inexpensive potentiometers have non-linear characteristics, and such characteristics vary from one potentiometer to another. Thus, the actual derailleur position is difficult to ascertain with such potentiometers, and the unpredictability from one potentiometer to another also makes derailleurs using such potentiometers unsuitable for mass production.

SUMMARY OF THE INVENTION

The present invention is directed to various features of a derailleur position processing apparatus. In one inventive feature, a derailleur position processing apparatus includes a derailleur moving member that moves with the derailleur; an analog signal providing mechanism operatively coupled to the derailleur moving member, wherein the analog signal providing mechanism provides an analog position signal in response to movement of the derailleur moving member; and a digital signal providing mechanism operatively coupled to the derailleur moving member, wherein the digital signal providing mechanism provides a digital position signal in response to movement of the derailleur moving member. Additional inventive features will become apparent from the description below, and such features may be combined with the above features to provide additional benefits.

BRIEF DESCRIPTION OF THE DRAWINGS

FIG. 9 is a table showing an embodiment of initial values stored in the analog position memory and the digital position memory at the factory;

FIG. 10 is a table showing an embodiment of values stored in the analog position memory and the digital position memory during setup;

FIG. 11 is a table showing an embodiment of values stored in the analog position memory and the digital position memory during initial operation of the device;

FIG. 12 is a table showing an embodiment of values stored in the analog position memory and the digital position memory after all values in the analog position memory have been updated; and FIG. 13 is a table showing how a position count value is updated during operation of the device.

DETAILED DESCRIPTION OF THE EMBODIMENTS

Figure 1:
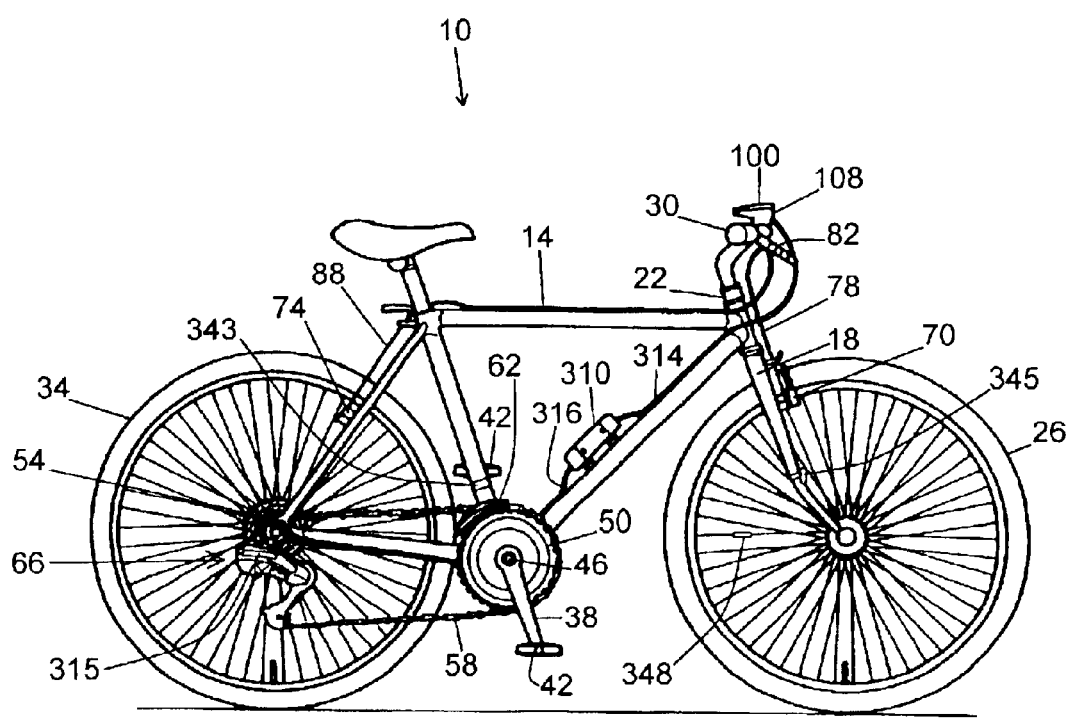
FIG. 1 is a side view of a bicycle that includes a particular embodiment of an electronically controlled bicycle transmission.
Figure 2:
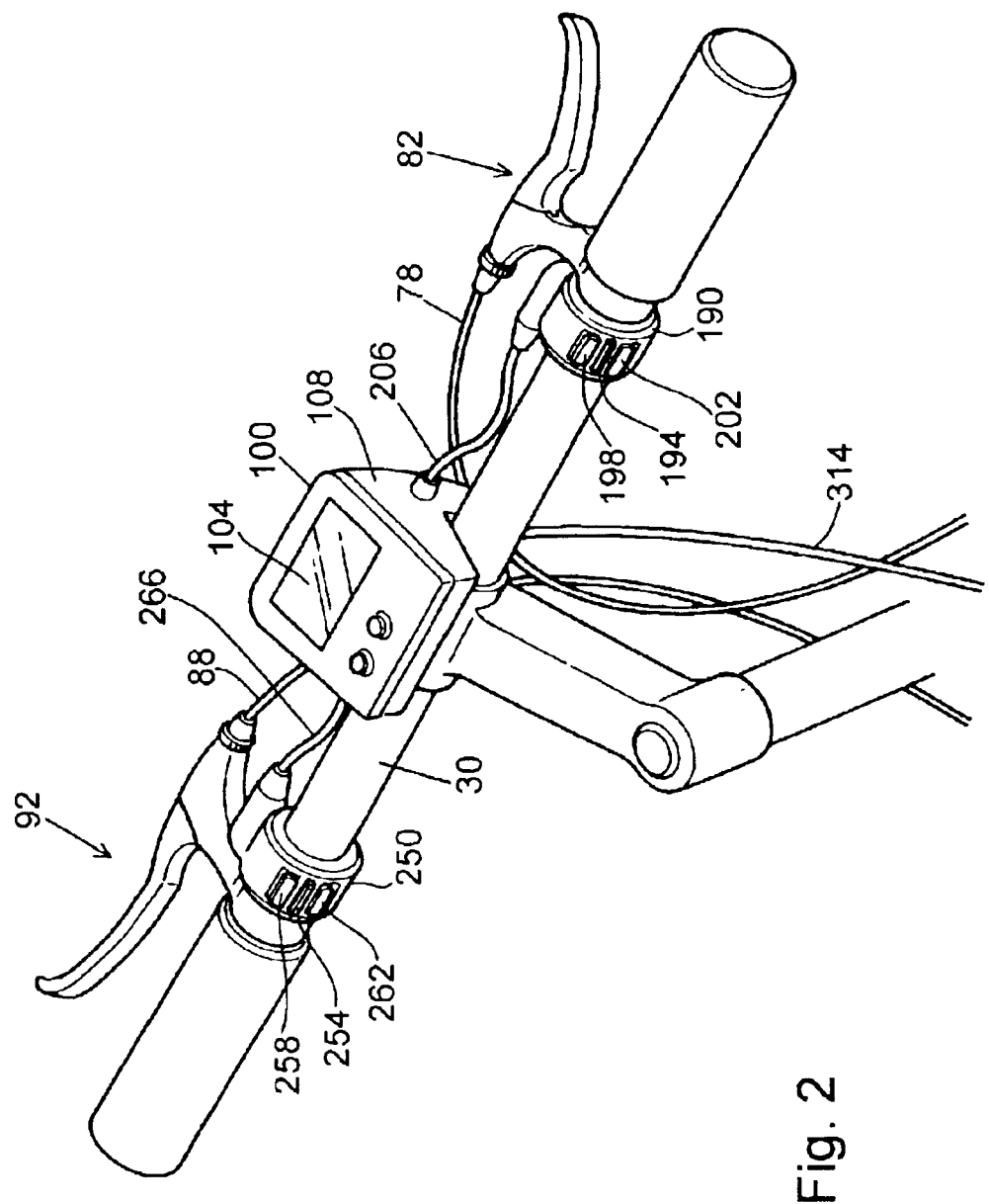
FIG. 2 is an oblique view of the handlebar mounted components of the electronically controlled bicycled transmission.

FIG. 1 is a side view of a bicycle 10 that includes a particular embodiment of an electronically controlled bicycle transmission. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a sprocket unit 54 comprising a plurality of rear sprockets 54a–54g (FIG. 3) are mounted to the rear wheel 34 for rotating with rear wheel 34. A chain 58 engages one of the plurality of front sprockets 50 and one of the plurality of rear sprockets 54a–54g. A front derailleur 62 is mounted to frame 14 in close proximity to the plurality of front sprockets 50 for moving chain 58 among the plurality of front sprockets 50, and a rear derailleur 66 is mounted to frame 14 in close proximity to the sprocket unit 50 for moving chain 58 among the plurality of rear sprockets 54a–54g. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30 as shown in FIG. 2. Similarly, rear braking unit 74 is connected to a Bowden-type control cable 88 that is connected to a brake lever assembly 92 mounted on the left side of handlebar 30.

As shown in FIGS. 1–2, a display housing 100 having an LCD display 104 is coupled to a mounting bracket 108 attached to handlebar 30. A right switch housing 190 containing a mode switch 194, a rear derailleur upshift switch 198, and a rear derailleur downshift switch 202 is mounted to the right side of handlebar 30. Similarly, a left switch housing 250 containing a mode switch 254, a front derailleur upshift switch 258, and a front derailleur downshift switch 262 is mounted to the left side of handlebar 30. The components disposed in right switch housing 190 are coupled to the components in display housing 100 through a communication path 206, and the components disposed in left switch housing 250 are coupled to the components in display housing 100 through a communication path 266. Mode switches 194 and 254 may be used to switch between a manual shifting mode and one or more automatic shifting modes, to change the information displayed on display 104, and so on. A main derailleur control unit 310 is mounted to frame 14, and it is electrically coupled to mounting bracket 108 through an intermediate communication path 314. A rear derailleur control housing 315 is mounted to rear derailleur 66, and it is electrically coupled to main derailleur control unit 310 through an intermediate communication path 316. A crank rotation sensor 343 is provided for sensing signals from a magnet (not shown) coupled to the left side crank arm 38 to determine the rate of rotation of crank arms 38 in a known manner, and a wheel rotation sensor 345 is provided for sensing signals from a magnet 348 mounted to front wheel 26 to determine the speed of the bicycle in a known manner. Crank rotation sensor 343 is coupled to main derailleur control unit 310 through a communication path 350 (FIG. 8), and wheel rotation sensor 345 is coupled to main derailleur control unit 310 through a communication path 354.

Figure 3:
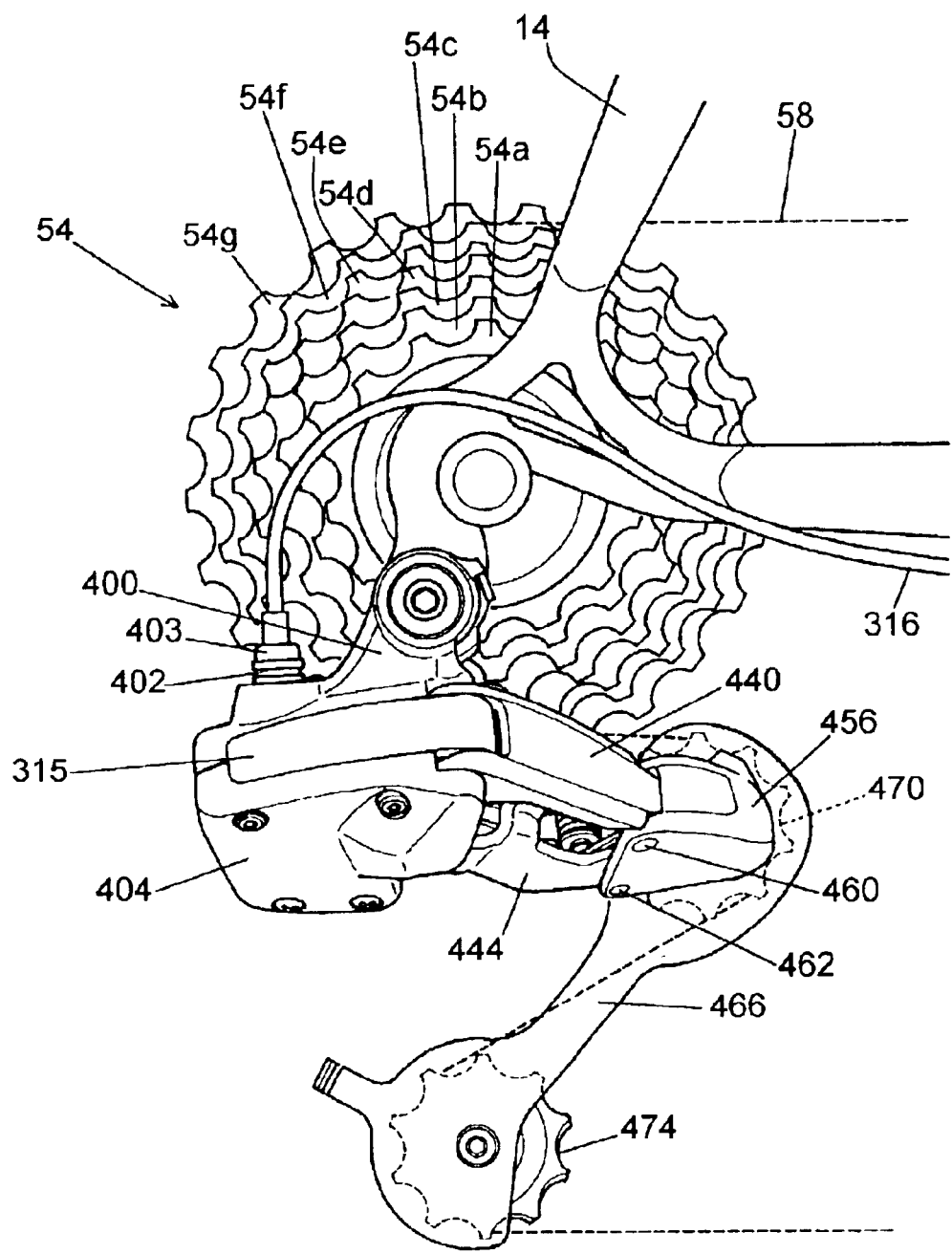
FIG. 3 is a closer view of the rear derailleur and sprocket assembly shown in FIG. 1.
Figure 4:
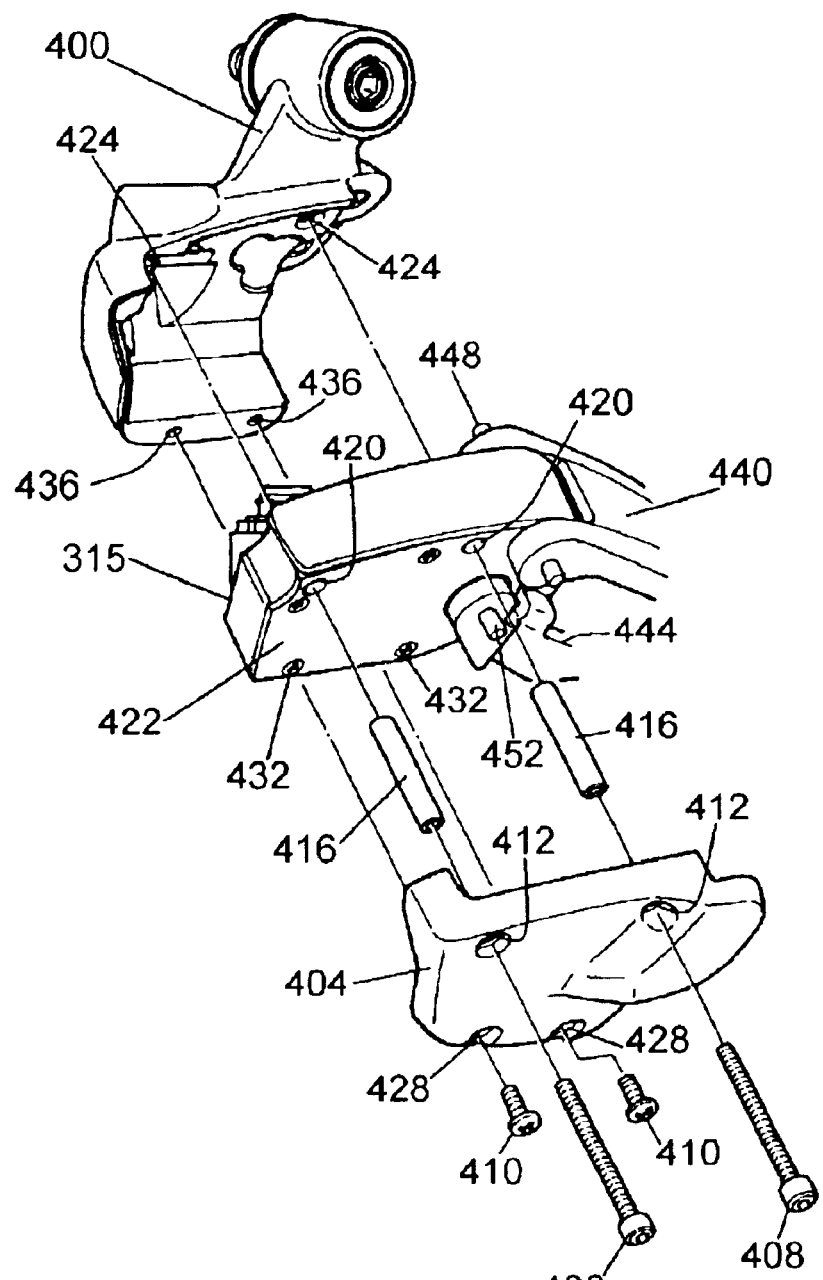
FIG. 4 is a partially exploded view of the derailleur shown in FIG. 3.

As shown in FIGS. 3 and 4, rear derailleur control housing 315 is mounted between a base member 400 and an outer cover 404 of rear derailleur 66. Base member 400 is swingably mounted to frame 14 in a known manner, and it includes an electrical connector 402 for connecting to a complementary connector 403 on intermediate communication path 316. As shown in FIG. 4, outer cover 404 and rear derailleur control housing 315 are mounted to base member 400 by screws 408 and 410. Screws 408 extend through openings 412 in outer cover 404, through spacer tubes 416 that extend through openings 420 in a rear derailleur control housing cover 422 and into threaded openings 424 in base member 400. Screws 410 extend through openings 428 in outer cover 404, through openings 432 in rear derailleur control housing cover 422, and into threaded openings 436 in base member 400.

Figure 6:
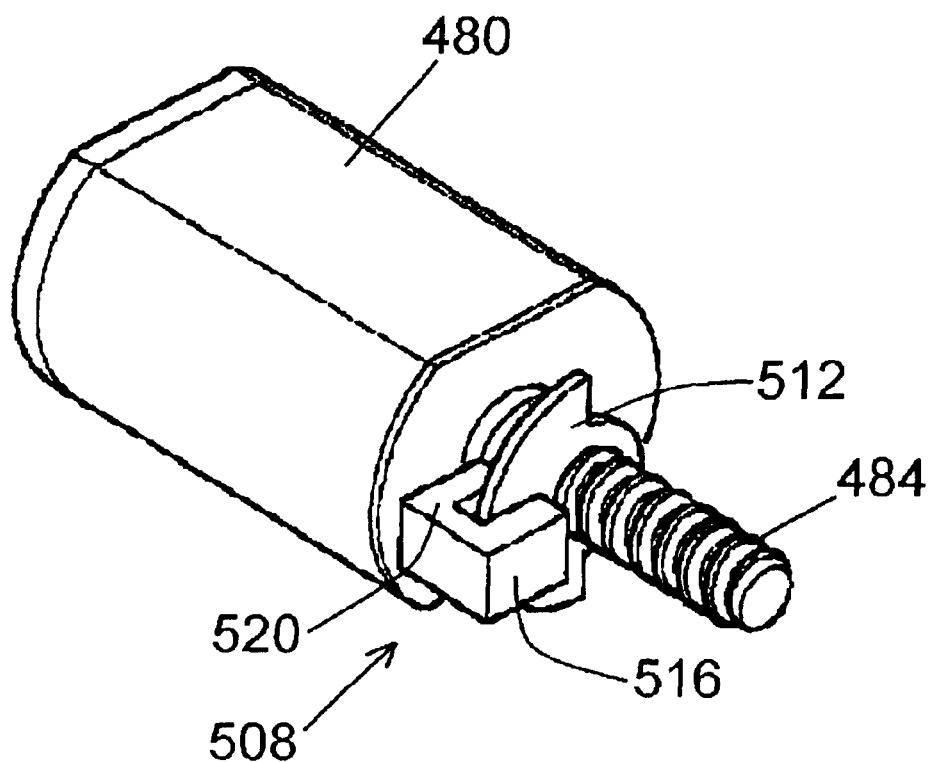
FIG. 6 is a more detailed view of the digital position sensor.
Figure 7:
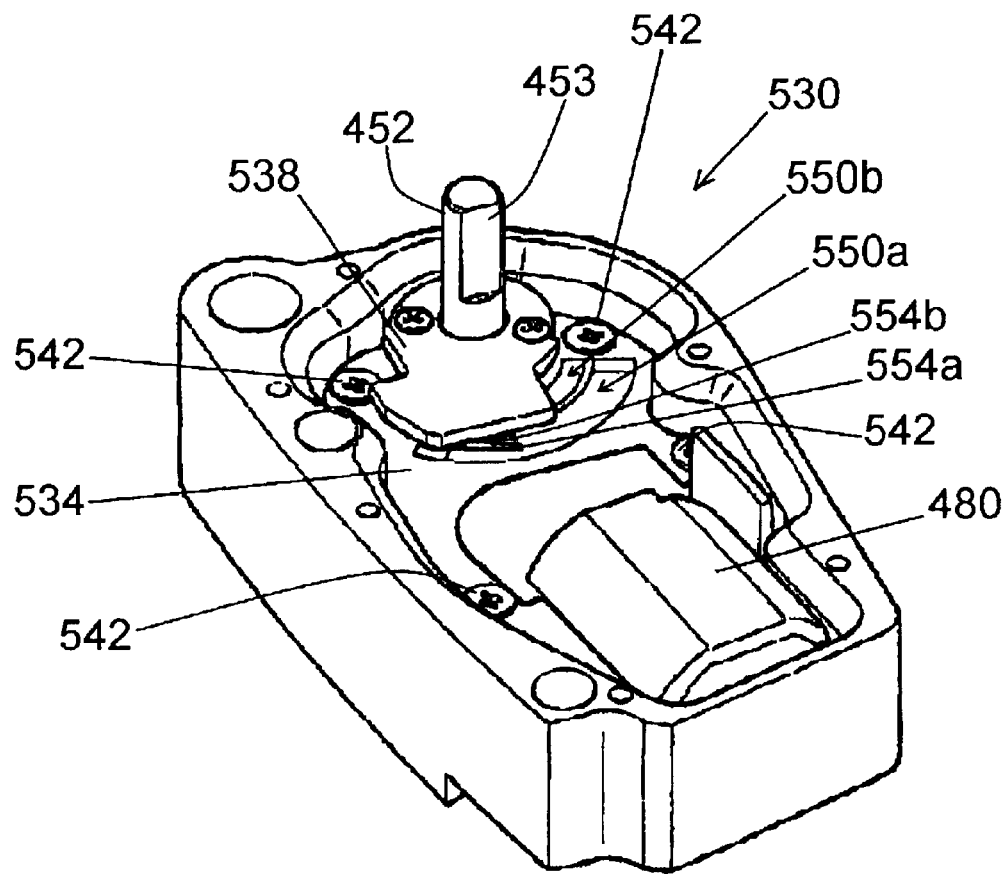
FIG. 7 is a view of the rear derailleur control housing illustrating a particular embodiment of an analog position sensor.

Rear derailleur 66 further comprises link members 440 and 444 pivotably coupled to rear derailleur control housing 315 through respective pivot shafts 448 and 452, wherein link member 444 is nonrotatably fixed to pivot shaft 452 by a flat 453 (FIG. 7). Pivot shaft 452 is but one example of a derailleur moving member that moves with the derailleur. The other ends of link members 440 and 444 are pivotably coupled to a movable member 456 through respective pivot shafts 460 and 462. Movable member 456 rotatably supports a chain guide 466 which, in turn, rotatably supports a guide pulley 470 and a tension pulley 474 for engaging chain 58 in a known manner. As discussed in more detail below, a motor 480 (FIGS. 5–7) rotates pivot shaft 452 for causing link member 444 to move movable member 456 and chain guide 466 laterally for transferring chain 58 among the plurality of rear sprockets 54a–54g.

Figure 5:
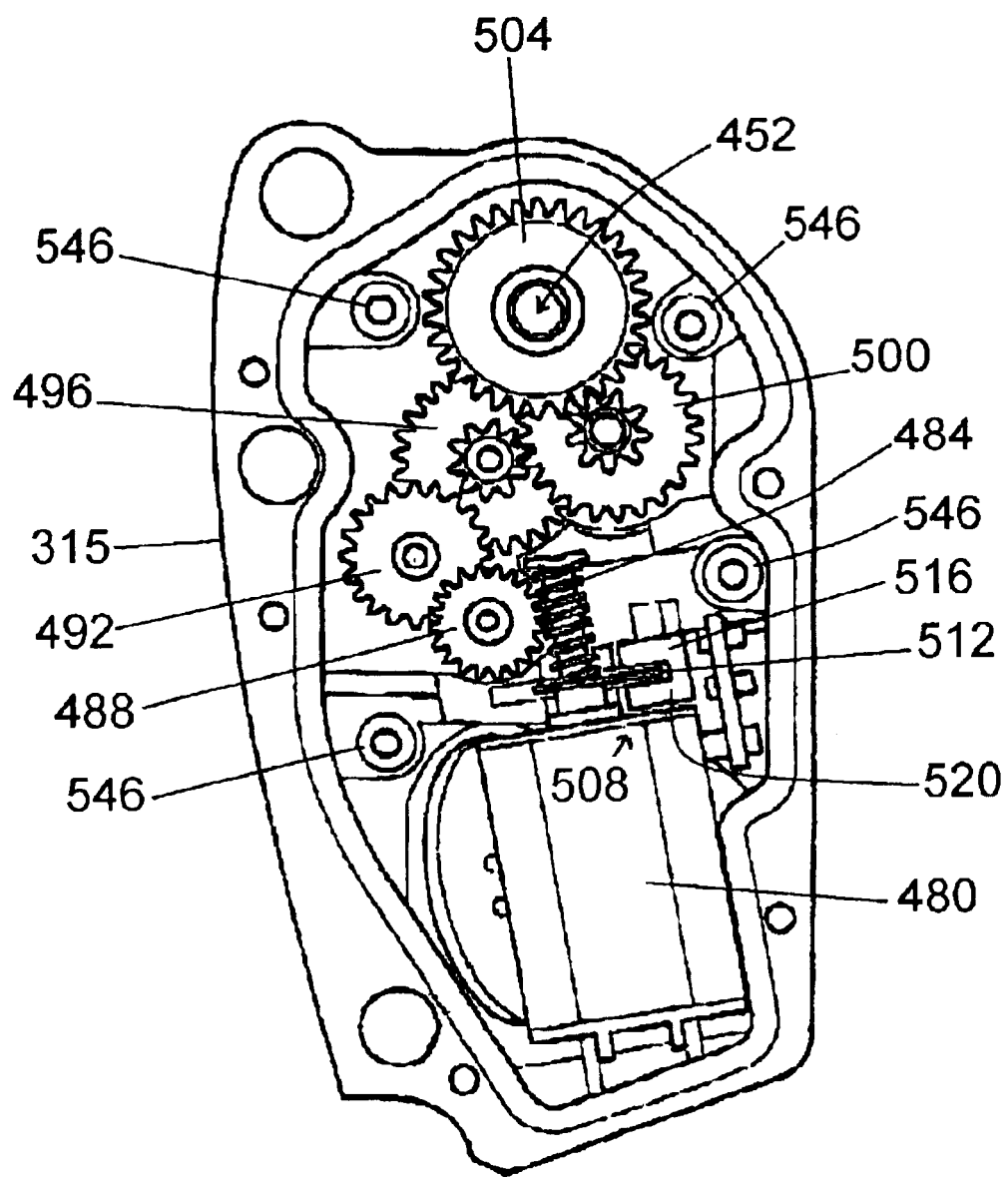
FIG. 5 is a view of the rear derailleur control housing illustrating a particular embodiment of a digital position sensor.

FIGS. 5–7 are views illustrating the contents of rear derailleur control housing 315 with rear derailleur control housing cover 422 (as well as a contact plate 534 (FIG. 7) discussed below) removed. As shown in FIG. 5, motor 480 includes a pinion drive shaft 484 that drives pivot shaft 452 through a gear reduction mechanism comprising gears 488, 492, 496, 500 and 504, wherein a small diameter gear portion of each gear 488, 492, 496 and 500 drives a larger diameter gear portion of the next gear in the power transmission path. Gear 504 rotates integrally with pivot shaft 452. A digital signal providing mechanism in the form of a digital position sensor 508 is mounted in rear derailleur control housing 315. As shown in FIGS. 5 and 6, digital position sensor 508 comprises an intermittent optical sensor that in includes a shutter wheel 512 that rotates integrally with pinion drive shaft 484, a light source such as LED 516 disposed on one side of shutter wheel 512, and a light detector such as a phototransistor 520 disposed on the other side of shutter wheel 512. Rotation of shutter wheel 512 with pinion drive shaft 484 causes the passage of light from LED 516 to phototransistor 520 to be intermittently blocked, thus producing a digital signal having a period determined by the rate of rotation of shutter wheel 512. Thus, the shape of the digital signal typically will be square or rectangular depending upon the operation condition. Thus, digital position sensor 508 functions as an intermittent optic sensor in this embodiment.

As shown in FIG. 7, an analog signal providing mechanism in the form of an analog position sensor 530 also is mounted in rear derailleur control housing 315. Analog position sensor 530 comprises a potentiometer that includes a contact plate 534 and a brush plate 538. Contact plate 534 is mounted to rear derailleur control housing 315 by screws 542 that screw into threaded openings 546 (FIG. 5), and it includes resistive contacts 550a and 550b. Brush plate 538 rotates integrally with pivot shaft 452, and it includes brushes 554a and 554b for contacting resistive contacts 550a and 550b to operate like a potentiometer in a known manner.

Figure 8:
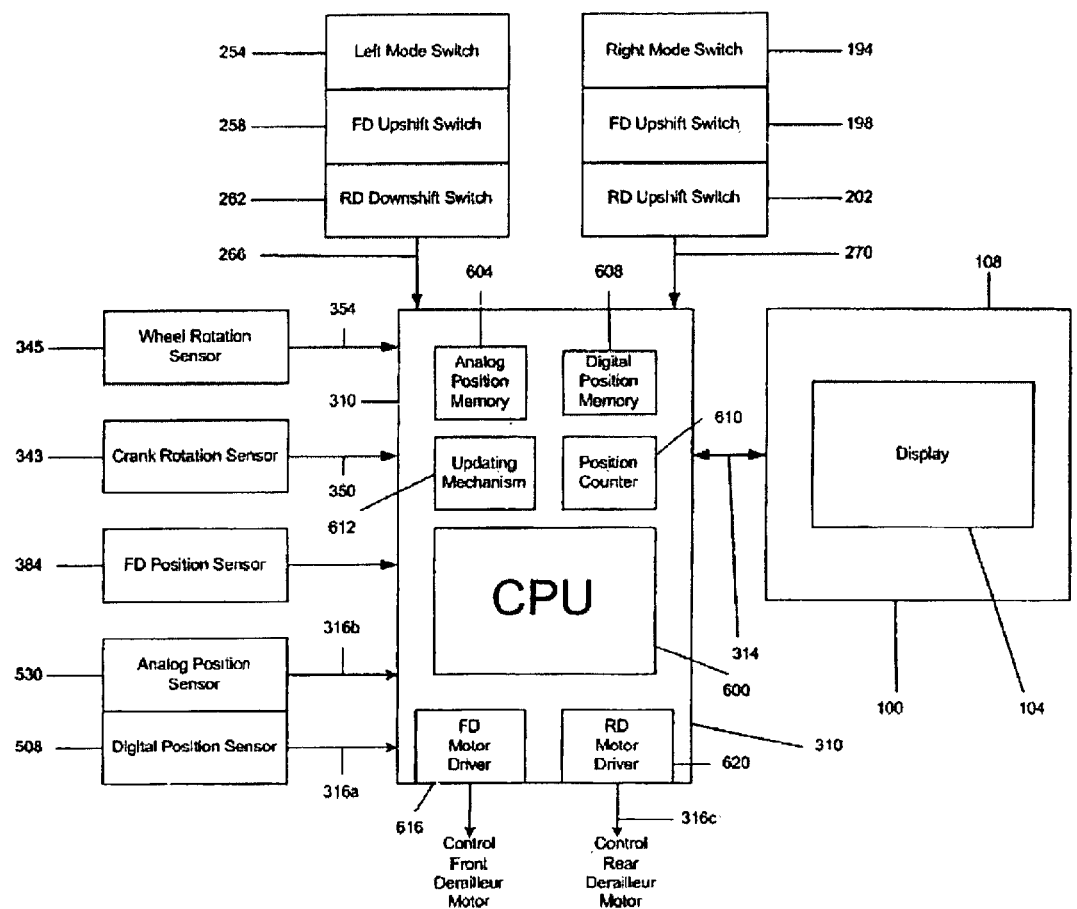
FIG. 8 is a block diagram of a particular embodiment of relevant features of the electronically controlled bicycle transmission.

FIG. 8 is a block diagram of a particular embodiment of relevant portions of the electronically controlled bicycle transmission, particularly main derailleur control unit 310. Main derailleur control unit 310 is a processing mechanism comprising a processing unit 600, an analog position memory 604 for storing a plurality of analog position values; a digital position memory 608 for storing a plurality of digital position values; a position counter 610; an updating mechanism 612 for updating at least one of the analog position memory 604 and digital position memory 608; a front derailleur motor driver 616 for providing signals for moving a motor (not shown) that moves front derailleur 62, and a rear derailleur motor driver 620 for providing signals for moving motor 480 in rear derailleur control housing 315 through a communication path 316c that forms part of communication path 316. Processing unit 600 determines the proper signals for driving motor 480 using the signals received from digital position sensor 508 and analog position sensor 530 over communication paths 316a and 316b, respectively, which also form a part of communication path 316.

This embodiment operates as follows. At the factory, the analog value from analog position sensor 530 when rear derailleur 66 is at a selected position (e.g., the position corresponding to fifth gear) is chosen as a reference value. That value is provided to the subsequent installer. Also, digital position memory 608 is loaded with count values that processor 600 can use to drive motor 480 so that rear derailleur 66 can move to each sprocket. In this embodiment, the contents of digital position memory 608 do not change after the device leaves the factory, but this is not necessary, and the values may be subsequently changed in other applications. Finally, an analog position value corresponding to each position of rear derailleur 66 is optionally entered into the appropriate position in analog position memory 604. The state of analog position memory 604 and digital position memory 608 at this time is shown in FIG. 9.

After the derailleur leaves the factory, the installer enters the reference value into the analog position memory 604. This may or may not be the same value entered into analog position memory 604 at the factory. Assume the reference value is (e'), and it corresponds to the fifth gear position. The contents of analog position memory 604 and digital position memory 608 at this time are shown in FIG. 10.

It is one inventive feature that the reference value (e') remains the same during subsequent operation of the derailleur. That is possible because, regardless of the non-linear profile of the potentiometer, the potentiometer will still have the reference value (e') when it is in the reference position. Thus, it is not necessary to memorize all of the resistance values for each position for each derailleur as would be necessary if only a potentiometer were used. Also at this time, processor 600 recognizes that, when the value from analog position sensor becomes e', then the value in position counter 610 should be E. Accordingly, digital position counter 610 may be initialized to the value E.

If desired, at this time rear derailleur 66 may be operated through all of the sprocket positions using digital position sensor 508 to recalibrate analog position memory 604. For example, if rear derailleur 66 is in the position indicated by a value of e' from analog position sensor 530, then processor 600 drives motor 480 to move rear derailleur 66 until position counter 610 contains a value of D. Then, updating mechanism 612 obtains the current value from potentiometer 530 (e.g., d') and calculates an updated value that is the average value $d''=(d+d')/2$. This value d" is stored in analog position memory 604 as the updated value as shown in FIG. 11. This process is continued until all of the values are updated (except for the reference value (e')) as shown in FIG. 12.

After all of the updatable values in analog position memory 604 are updated, the signals from analog position sensor 530 are used to control the movement of rear derailleur 66. For example, when it is desired to move rear derailleur 66 to the fourth gear position, then processor 600 operates motor 480 until analog position sensor 530 provides a signal corresponding to a value of d" (or d' if analog position memory 604 was not previously updated). Position counter 610 is incremented or decremented accordingly.

It is another feature of this embodiment that, when the value in position counter 610 becomes equal to one of the values in digital position memory 608, then the corresponding value in analog position memory 604 is updated in a manner similar to that described above. Thus, when the value in position counter 610 becomes D, then updating mechanism 612 obtains the current signal from potentiometer 530 (e.g., corresponding to a value of d") and calculates an updated value that is the average value $d'''=(d'+d'')/2$. This value d'" is stored in analog position memory 604 as the updated value (similar to that shown in FIG. 11). It is possible at this time that the signal from analog position sensor 530 will correspond to a value that is the same as the value stored in analog position memory 604. In this case, the calculated updated value in this embodiment will be the same as the value already stored in analog position memory, in which case analog position memory 604 need not be updated. Optionally, updating analog position memory 604 in this manner will ensure very accurate control of rear derailleur 66 as the values corresponding to the signals from analog position sensor 530 change for a particular gear.

There is a risk that the value in position counter 610 will become inaccurate because of missed or spurious counts from digital position sensor 608. In other words, the value in position counter 610 may be D' when rear derailleur 66 is in fourth gear, whereas the correct value should be D. While slight inaccuracies may not affect the operation of the derailleur, such errors could accumulate over time to a point where rear derailleur 66 begins to malfunction. To prevent this from happening, processor 600 detects whenever the signal from analog position sensor 630 corresponds to a value that equals the reference value e'. Since the count value should be E at this time, updating mechanism 612 updates the value in position counter 610 to E as shown in FIG. 13. Since rear derailleur 66 likely will pass through the fifth gear position rather frequently, the value in position counter 610 likewise will be updated frequently, thus minimizing the risk that position counter 610 contains a value that would cause rear derailleur 66 to malfunction.

While the above is a description of various embodiments of inventive features, further modifications may be employed without departing from the spirit and scope of the present invention. For example, while the signals from analog position sensor 530 were used by processor 600 to operate rear derailleur 66 in the embodiment describe above, the signals from digital position sensor 608, the digital position values stored in digital position memory 608, and the value stored in position counter 610 may be used by processor 600 to drive motor 480, and the values in analog position memory 604 may be used to indicate the position of rear derailleur 66 on display 104 or for other purposes. In this case the value in position counter 610 could be updated whenever the value corresponding to a signal provided by analog position sensor 530 reaches a selected value in the same manner noted above.

Analog position sensor 530 may comprise a magnetic device, a contact device, an electric field device, or any suitable device that provides analog signals. Digital position sensor 508 may comprise a magnetic device, a contact device, an electric field device, or any suitable device that provides digital signals in the broad sense of discrete signals. Although square or rectangular signals were provided in the disclosed embodiments, triangular, sawtooth, and other shaped signals may be provided. The digital signals may comprise multibit signals as well. The position processing apparatus may be used with a front derailleur. The position sensors may be operatively coupled to any moving part of the transmission that causes movement of the derailleur. The contents of digital position memory 608 need not be set at the factory, and the installer need not recalibrate the analog position memory 604. The reference value may be changed to accommodate aging of the potentiometer.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A derailleur position processing apparatus comprising:
   a derailleur moving member that moves with the derailleur;
   an analog signal providing mechanism operatively coupled to the derailleur moving member, wherein the analog signal providing mechanism provides an analog position signal in response to movement of the derailleur moving member; and
   a digital signal providing mechanism operatively coupled to the same derailleur moving member as the analog signal providing mechanism, wherein the digital signal providing mechanism provides a digital position signal in response to movement of the derailleur moving member.

2. The apparatus according to claim 1 wherein the analog signal providing mechanism comprises a potentiometer.

3. The apparatus according to claim 1 wherein the digital signal providing mechanism comprises an intermittent optical sensor.

4. The apparatus according to claim 1 wherein the analog signal providing mechanism comprises a potentiometer, and wherein the digital signal providing mechanism comprises an intermittent optical sensor.

5. The apparatus according to claim 1 further comprising:
   an analog position memory that stores a plurality of analog position values corresponding to a plurality of positions of the derailleur moving member; and
   a digital position memory that stores a plurality of digital position values corresponding to the plurality of positions of the derailleur moving member.

6. The apparatus according to claim 5 further comprising:
   a motor for moving the derailleur moving member; and
   a processing mechanism that controls the motor in accordance with at least one of the analog position values stored in the analog position memory and the digital position values stored in the digital position memory.

7. The apparatus according to claim 6 wherein the processing mechanism comprises an updating mechanism for updating one of the analog position memory and the digital position memory using the values stored in the other one of the analog position memory and the digital position memory when the processing mechanism moves the motor in accordance with the values stored in the other one of the analog position memory and the digital position memory.

8. The apparatus according to claim 7 further comprising a position counter that stores a position count value corresponding to a position of the derailleur moving member.

9. The apparatus according to claim 8 wherein at least one of the plurality of analog position values comprises a reference value, and wherein the updating mechanism sets the position count value to a predetermined value when the analog position signal corresponds to the reference value.

10. The apparatus according to claim 9 wherein the analog signal providing mechanism comprises a potentiometer.

11. The apparatus according to claim 9 wherein the digital signal providing mechanism comprises an intermittent optical sensor.

12. The apparatus according to claim 9 wherein the analog signal providing mechanism comprises a potentiometer, and wherein the digital signal providing mechanism comprises an intermittent optical sensor.

13. The apparatus according to claim 7 wherein the processing mechanism moves the motor in accordance with the digital position values stored in the digital position memory, and wherein the updating mechanism updates the analog position values stored in the analog position memory.

14. The apparatus according to claim 13 wherein the updating mechanism updates an analog position value stored in the analog position memory using the analog position signal.

15. The apparatus according to claim 14 wherein the updating mechanism updates the analog position value stored in the analog position memory with an average value of a currently stored analog position value and a current value from the analog position signal.

16. The apparatus according to claim 10 wherein at least one of the plurality of analog position values comprises a reference value, and wherein the updating mechanism does not update the reference value.

17. The apparatus according to claim 16 wherein the analog signal providing mechanism comprises a potentiometer.

18. The apparatus according to claim 16 wherein the digital signal providing mechanism comprises an intermittent optical sensor.

19. The apparatus according to claim 16 wherein the analog signal providing mechanism comprises a potentiometer, and wherein the digital signal providing mechanism comprises an intermittent optical sensor.

20. A method of processing a position of a derailleur that includes a motor for moving a derailleur moving member, wherein the method comprises the steps of:
   providing an analog position signal in response to movement of the derailleur moving member;
   providing a digital position signal in response to movement of the derailleur moving member;
   storing, in analog position memory, a plurality of analog position values corresponding to a plurality of positions of the derailleur moving member;
   storing, in a digital position memory, a plurality of digital position values corresponding to a plurality of positions of the derailleur moving member;
   controlling the motor in accordance with at least one of the analog position values stored in the analog position memory and the digital position values stored in the digital position memory; and
   updating on of the analog position memory and the digital position memory using the values stored in the other one of the analog position memory and the digital position memory when the motor is moved in a accordance with the values stored in the other one of the analog position memory and the digital position memory.

* * * * *